United States Patent
Lee et al.

(10) Patent No.: US 9,661,102 B2
(45) Date of Patent: May 23, 2017

(54) SYSTEM AND METHOD FOR SHARING DATA

(75) Inventors: Kang-Chun Lee, Bucheon-si (KR);
Chang-Dae Bang, Hwaseong-si (KR);
Il-Woo Park, Yongin-si (KR);
Woo-Sok Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 13/401,781

(22) Filed: Feb. 21, 2012

(65) Prior Publication Data
US 2012/0215885 A1   Aug. 23, 2012

(30) Foreign Application Priority Data
Feb. 21, 2011 (KR) .................. 10-2011-0014975

(51) Int. Cl.
| | | |
|---|---|---|
| G06F 15/16 | (2006.01) | |
| G06F 15/177 | (2006.01) | |
| H04L 29/08 | (2006.01) | |
| H04L 29/06 | (2006.01) | |
| H04N 21/436 | (2011.01) | |
| H04N 21/63 | (2011.01) | |

(52) U.S. Cl.
CPC ............ *H04L 67/325* (2013.01); *H04L 69/08* (2013.01); *H04N 21/43615* (2013.01); *H04N 21/631* (2013.01)

(58) Field of Classification Search
CPC . H04L 69/08; H04L 12/2818; H04L 67/2823; H04L 12/1859; H04L 12/2803; H04L 12/2812; H04L 12/2836; H04L 12/5692; H04N 21/4622

USPC ....... 709/201, 203, 217–219, 220, 223, 227, 709/228, 230, 231, 236, 237, 246
See application file for complete search history.

(56) References Cited

U.S. PATENT DOCUMENTS

| | | | | |
|---|---|---|---|---|
| 5,894,478 A * | 4/1999 | Barzegar | ............. | H04W 88/005 370/401 |
| 6,658,471 B1 * | 12/2003 | Berry | ................. | G06F 11/3466 709/224 |
| 6,813,251 B1 * | 11/2004 | Garney | ................. | G06F 13/405 370/257 |
| 7,340,508 B1 * | 3/2008 | Kasi | ....................... | G06Q 10/10 709/203 |
| 7,907,954 B2 * | 3/2011 | Poyhonen | ............. | H04W 88/06 345/581 |
| 7,970,918 B2 * | 6/2011 | Thompson | .......... | H04L 12/5695 709/230 |
| 7,970,943 B2 * | 6/2011 | Lin | ................... | G06F 17/30569 707/602 |
| 8,190,658 B2 * | 5/2012 | Yeom | ...................... | H04L 12/12 707/825 |

(Continued)

FOREIGN PATENT DOCUMENTS

| | | |
|---|---|---|
| KR | 10-2006-0035529 | 4/2006 |
| KR | 10-2007-0063676 | 6/2007 |

*Primary Examiner* — Edward Kim

(57) ABSTRACT

A data sharing system includes at least one first client device, at least one second client device, and a hub equipment. The at least one first client device provides data. The at least one second client device receives data. The hub equipment receives data from the first client device using a first transmission protocol, and transmits the received data to the second client device using a second transmission protocol.

15 Claims, 7 Drawing Sheets

(56) References Cited

U.S. PATENT DOCUMENTS

| | | | |
|---|---|---|---|
| 2002/0090001 A1* | 7/2002 | Beckwith | H04L 12/5692 370/466 |
| 2002/0099633 A1* | 7/2002 | Bray | G06F 17/211 705/35 |
| 2002/0112031 A1* | 8/2002 | Franklin | H04L 29/06 709/219 |
| 2003/0018657 A1 | 1/2003 | Monday | |
| 2004/0015596 A1* | 1/2004 | Sapuram | G06Q 10/10 709/230 |
| 2004/0122921 A1* | 6/2004 | Dausch | G07C 5/008 709/223 |
| 2006/0161635 A1* | 7/2006 | Lamkin | G06F 17/30041 709/217 |
| 2006/0208871 A1* | 9/2006 | Hansen | G06F 3/1454 340/506 |
| 2006/0217072 A1* | 9/2006 | Poyhonen | H04W 88/06 455/67.11 |
| 2006/0271384 A1* | 11/2006 | Munson | G06F 9/465 709/203 |
| 2007/0098019 A1 | 5/2007 | Kelly et al. | |
| 2007/0124441 A1* | 5/2007 | Ko | H01M 8/04992 709/223 |
| 2007/0180485 A1* | 8/2007 | Dua | H04L 29/06027 725/114 |
| 2007/0211734 A1* | 9/2007 | Yang | H04L 12/2818 370/401 |
| 2007/0226351 A1* | 9/2007 | Fischer | H04W 76/023 709/227 |
| 2008/0242346 A1* | 10/2008 | Rofougaran | H04B 1/0067 455/552.1 |
| 2009/0049200 A1* | 2/2009 | Lin | G06F 17/30569 709/246 |
| 2009/0100176 A1* | 4/2009 | Hicks, III | G06F 15/16 709/224 |
| 2009/0268754 A1* | 10/2009 | Palm | H04L 67/2823 370/466 |
| 2009/0327507 A1* | 12/2009 | Douillet | H04L 12/2812 709/230 |
| 2010/0005183 A1* | 1/2010 | Ding | H04L 63/06 709/229 |
| 2010/0235487 A1* | 9/2010 | Guthery | H04L 63/0853 709/223 |
| 2010/0268765 A1* | 10/2010 | Honjo | H04N 21/4344 709/203 |
| 2011/0126134 A1* | 5/2011 | Macken | G06F 17/3089 715/760 |
| 2011/0165859 A1* | 7/2011 | Wengrovitz | H04M 1/7253 455/411 |

\* cited by examiner

| DEVICE NAME | TRIGGER | | | |
| --- | --- | --- | --- | --- |
| | CONDITION | OPERATION NAME | KIND | OBJECT |
| HHP | APPROACH WITHIN RADIUS OF 20 M | DATA SHARING 1 | SEND DATA | PC |
| PC | 10:00 PM ARRIVES | DATA SHARING 2 | SEND DATA | PICASA (http://www.picasa.google.com/) |
| ... | ... | ... | ... | ... |

FIG.3

| TIME | SCHEDULE OF DATA SHARING ||
|---|---|---|
| | DATA PROVIDING DEVICE | DATA RECEIVING DEVICE |
| PM 10:00 | HHP | PICASA (http://www.picasa.google.com/) |
| PM 11:00 | DSC | PC |
| ... | ... | ... |

FIG.4

| DEVICE NAME | SHARING PATH | |
|---|---|---|
| | UPLOAD PATH | DOWNLOAD PATH |
| PC | C:/PICTURE/ | D:/DOWNLOAD/ |
| ... | ... | ... |

FIG.5 sharing data. More particularly, the present disclosure relates to a system and a method capable of sharing data between devices that support transmission protocols of different kinds.

BACKGROUND OF THE INVENTION

Currently, with development of electronic communication industries, electronic devices such as a mobile phone, a Personal Digital Assistant (PDA), a digital Television (TV), etc. have become necessities of a modern society, and serve as an important means for transferring information changing fast. As everybody knows, such electronic devices are evolving into intelligence-oriented devices having a computer support function such as Internet communication, information search, etc. These intelligence-oriented electronic devices are easily found in a general household. Recently, these electronic devices (for example, a smart phone, an Internet Protocol Television (IPTV), etc.) are connected and realized as a network. For example, a home network using a Digital Living Network Alliance (DLNA) technology exists.

Generally, devices connected via a network may share contents such as photos, moving images, etc. For this purpose, connected devices should have the same transmission protocol. The transmission protocol is a promise regarding various communication rules and methods determined for facilitating information exchange when the information exchange between information devices is required. Know examples of the transmission protocols include a Picture Transfer Protocol (PTP), a Media Transfer Protocol (MTP), etc.

As described above, under an environment where a plurality of devices are connected via a network, an alternative for sharing data between devices having different protocols is required. In addition, under a circumstance where mobile devices such as a smart phone are gradually evolving into individual-oriented devices, an alternative for personalizing data sharing under this network environment is also required.

SUMMARY OF THE INVENTION

To address the above-discussed deficiencies of the prior art, it is a primary object to provide at least the advantages described below. Accordingly, an aspect of the present disclosure is to provide a system and a method for sharing data between devices having transmission protocols of different kinds.

Another aspect of the present disclosure is to provide a system and a method for sharing data personalized between devices connected via a network.

Still another aspect of the present disclosure is to provide a hub equipment for having various transmission protocols and allowing data to be shared between devices having transmission protocols of different kinds.

Other aspects, advantages and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings in which:

FIG. 3 illustrates a view for contents in which a trigger regarding data sharing for each client device has been registered according to an exemplary embodiment of the present disclosure;

FIG. 4 illustrates a view for contents in which a schedule of data sharing according to time has been registered according to an exemplary embodiment of the present disclosure;

FIG. 5 illustrates a view for contents in which a data sharing path for each device has been registered according to an exemplary embodiment of the present disclosure;

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present disclosure are provided for illustration purpose only and not for the purpose of limiting the invention as defined by the appended claims and their equivalents.

Exemplary embodiments of the present disclosure provide a system and a method for sharing data between devices having different kinds of protocols. Exemplary embodiments of the present disclosure provide a hub equipment having various protocols and allowing data to be shared between devices having different kinds of protocols.

Figure 1:
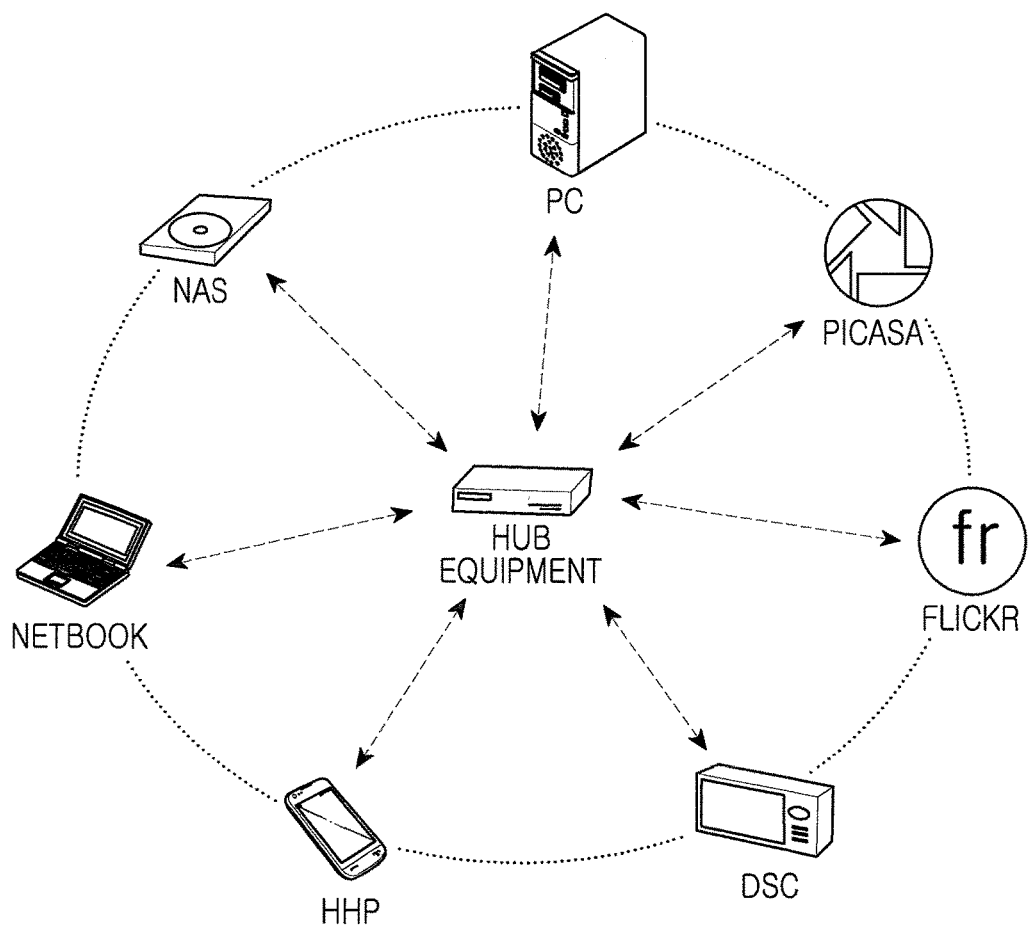
FIG. 1 illustrates a view for a data sharing system according to an exemplary embodiment of the present disclosure.

FIG. 1 illustrates a view for a data sharing system according to an exemplary embodiment of the present disclosure.

Referring to FIG. 1, the data sharing system includes client devices serving as a data provider or a data receiver, and a hub equipment for connecting the client devices.

The client device may be a NetBook, a Personal Computer (PC), a Network Attracted Storage (NAS), a Digital Still Camera (DSC), a Hand-held Phone (HHP), etc. as illustrated. In addition, the client device may be a relevant web (server) (for example, PICASA® or FLIKER® content sharing server). The hub equipment may freely access different kinds of networks such as a $3^{rd}$ Generation network, a WiFi network, a Wibro network, etc. to connect to the web (server).

When an event for executing data sharing set in advance occurs, the hub equipment receives data from a data providing client, and transmits the received data to a data receiving client. For example, the hub equipment performs an operation of uploading a photo stored by a PC to a relevant web at 9:00 pm. For another example, when a registered smart phone approaches and is connected, the hub equipment performs an operation of transmitting a photo stored in the smart phone to a PC.

Such data sharing may be configured using at least one data providing client device and at least one data receiving client device. That is, the data sharing may be configured using one data providing client device and one or more data receiving client devices, or using a plurality of data providing client devices and one data receiving client device.

The hub equipment provides a user interface for configuration of the data sharing. A user may set registration of a client device that the user allows to participate in the data sharing, registration of a device providing data and a device receiving data, registration of a trigger regarding the data sharing, registration of a schedule regarding the data sharing, and registration of a data sharing path, etc. via the user interface. For example, a relevant client device may be set as a receiver receiving data as well as a provider providing data.

In addition, the hub equipment may receive and store data of a relevant client device.

More particularly, the hub equipment has various protocols and performs data sharing between client devices supporting different kinds of transmission protocols. For example, a first client device transmits data to the hub equipment using a first transmission protocol, and the hub equipment transmits again the received data to a second client device using a second transmission protocol. That is, clients having different kinds of protocols may share data via the hub equipment supporting various transmission protocols. This provides an advantage that a client device does not have to have various transmission protocols.

Figure 2:
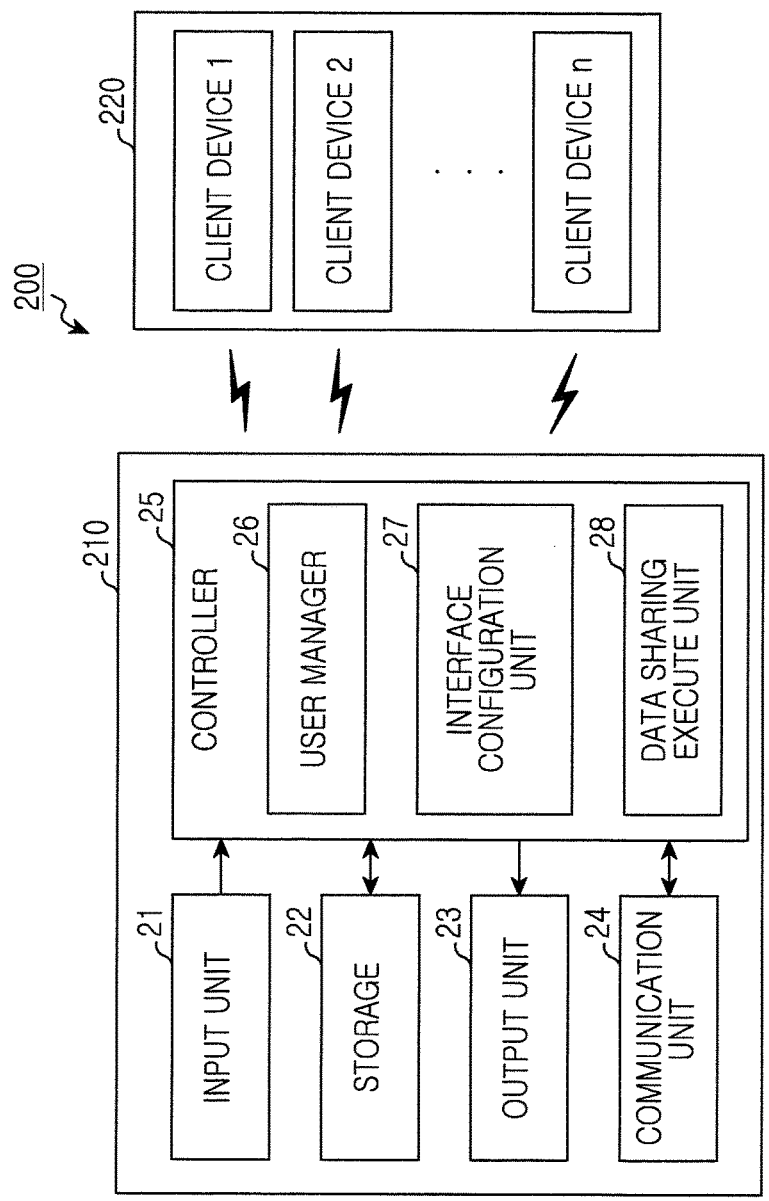
FIG. 2 illustrates a block diagram for a data sharing system according to an exemplary embodiment of the present disclosure.

FIG. 2 illustrates a block diagram for a data sharing system according to an exemplary embodiment of the present disclosure.

Referring to FIG. 2, the data sharing system 200 includes a hub equipment 210 and a plurality of client devices 220 connected to the hub equipment via a network.

The hub equipment 210 includes an input unit 21 for receiving a user input, a storage 22 for storing data, an output unit 23 for outputting data stored in the storage 22 in the form of voice or an image signal, a communication unit 24 for communication, and a controller 25 for performing an overall control of an operation. Since this is a generally known configuration, detailed description thereof is omitted. However, what needs to be noted, according to an exemplary embodiment of the present disclosure, the hub equipment 210 supports various transmission protocols. Therefore, client devices supporting different kinds of protocols may share data via the hub equipment 210. That is, a first client device may transmit contents to the hub equipment 210 using a first transmission protocol, and the hub equipment 210 may transmit the contents received from the first client device to a second client device using a second transmission protocol. Information regarding these transmission protocols are stored in the storage 22, and the controller 25 may select and use a transmission protocol suitable for a connected client device.

In addition, the hub equipment 210 according to an exemplary embodiment of the present disclosure includes a user manager 26, an interface configuration unit 27 regarding data sharing, and a data sharing execute unit 28. As illustrated, the controller 25 controlling an overall operation may include the user manager 26, the interface configuration unit 27, and the data sharing execute unit 28, which will be described below.

The user manager 26 registers a user who may set an interface environment regarding data sharing. To set interface environment, a log-in process for allowing a user to input a password may be involved.

The interface configuration unit 27 regarding the data sharing (referred to as an "interface configuration unit" hereinafter) provides a user interface regarding data sharing. A user authenticated by the user manager 26 may set interface environment regarding data sharing via the user interface. The interface environment regarding the data sharing may include registration of a client device, registration of a trigger regarding data sharing, registration of a schedule regarding data sharing, registration of a data sharing path, etc.

The registration of the client device registers a device providing data and a device receiving data. The registration of the client device includes searching for a device that may be connected via a network and selecting a device which a user allows to participate in data sharing among searched devices. Network configuration according to an exemplary embodiment of the present disclosure may use one of Digital Living Network Alliance (DLNA), Bluetooth, Near Field Communication (NFC), and Wireless Fidelity (WiFi). Furthermore, the registration of the client device includes registering a relevant web as an object of data sharing. The registration of the client device includes registering an ID and a password required for accessing a relevant web.

The registration of the trigger regarding the data sharing is to register to perform relevant data sharing when a (trigger) condition is met. FIG. 3 illustrates a view for contents in which a trigger regarding data sharing for each client device has been registered according to an exemplary embodiment of the present disclosure. For example, an HHP performs data sharing 1 when a device approaches within a radius of 20 m (that is, a client device approaches and connection is detected). The data sharing 1 is an operation of receiving contents of the HHP and transmitting again the contents to a PC. In addition, a PC performs data sharing 2 when 10:00 pm arrives. The data sharing 2 is an operation of receiving contents of a PC and transmitting again the contents to a Picasa® content sharing server. Besides, a condition that allows relevant data sharing to be performed may be whether a user login has been performed, whether contents of a connected client device are updated, a period, etc.

The registration of the schedule regarding the data sharing is to set a plan regarding data sharing set according to time. FIG. 4 illustrates a view for contents in which a schedule of data sharing according to time has been registered according to an exemplary embodiment of the present disclosure. For example, when 10:00 pm arrives, data sharing of receiving contents stored by an HHP and transmitting again the contents to the Picasa® content sharing server is performed. In addition, when 11:00 pm arrives, data sharing of receiving contents stored by a DSC and transmitting again the contents to a PC is performed.

The registration of the data sharing path is to designate a position at which a client device uploads data and a position at which a client device downloads received data. FIG. 5 illustrates a view for contents in which a data sharing path for each device has been registered according to an exemplary embodiment of the present disclosure. For example, a PC transmits contents existing on a path of "C:/PICTURE" to the hub equipment 210, and stores contents received from the hub equipment 210 in a path of "D:/DOWNLOAD/".

Besides the above-described registrations, the interface environment regarding data sharing will be various. For example, the interface environment regarding data sharing may further include a kind (format), a size setting of data, etc.

The interface configuration unit 27 stores a set interface environment in the storage 22 as a database.

The data sharing execute unit 28 loads an execute schedule, a condition, and an environment registered by the interface configuration unit 27 from the storage 22 to perform relevant data sharing.

In this data sharing system, a process of transmitting/receiving data between the hub equipment 210 and the client devices 220 may require synchronization. Since this synchronization is well known in the art, detailed description thereof is omitted.

Figure 6:
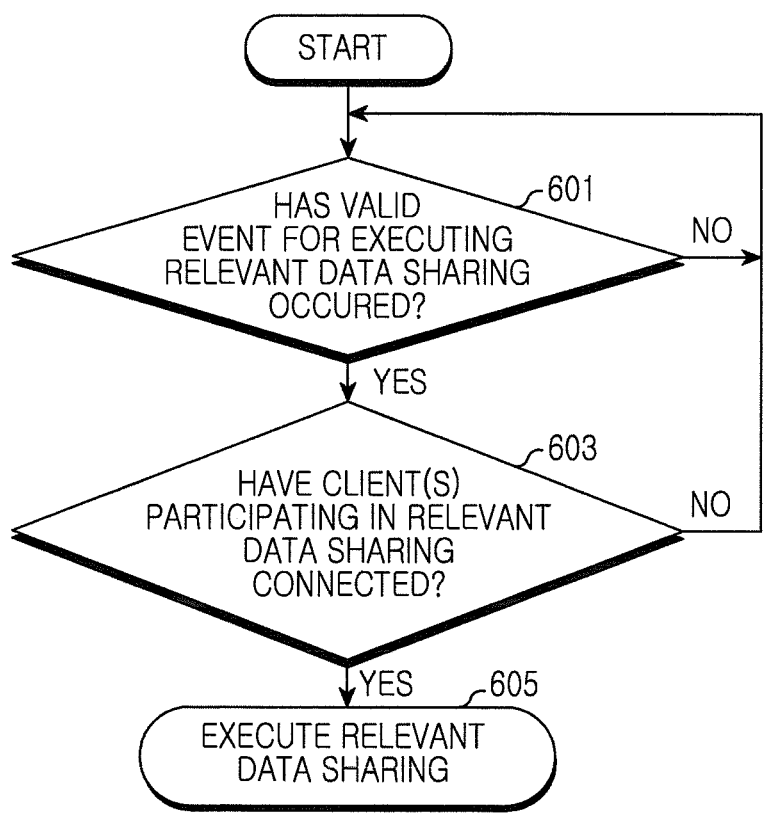
FIG. 6 illustrates a flowchart for a procedure for sharing data according to an exemplary embodiment of the present disclosure.

FIG. 6 illustrates a flowchart for a procedure for sharing data according to an exemplary embodiment of the present disclosure.

Referring to FIG. 6, the controller 25 determines whether a valid event (or condition) for executing relevant data sharing occurs in step 601. As described above, the condition may be whether a set time arrives, whether a registered client device approaches and is connected, etc.

When the valid event occurs, the controller 25 determines whether client devices participating in relevant data sharing are connected in step 603. When the client devices participating in the relevant data sharing are connected, the controller 25 executes the relevant data sharing in step 605. In the example where the relevant data sharing is to store or keep data of the connected client devices, the controller 25 may determine whether client devices providing data are connected. In contrast, in the example where the relevant data sharing requires a client device providing data and a client device receiving data, the controller 25 needs to determine whether both the two devices are connected in step 603. At this point, when only one of the client devices is connected, the relevant data sharing is not executed. Depending on cases, if one client device is connected and then the other client device is connected in a predetermined valid time, the relevant data sharing may be valid.

Figure 7:
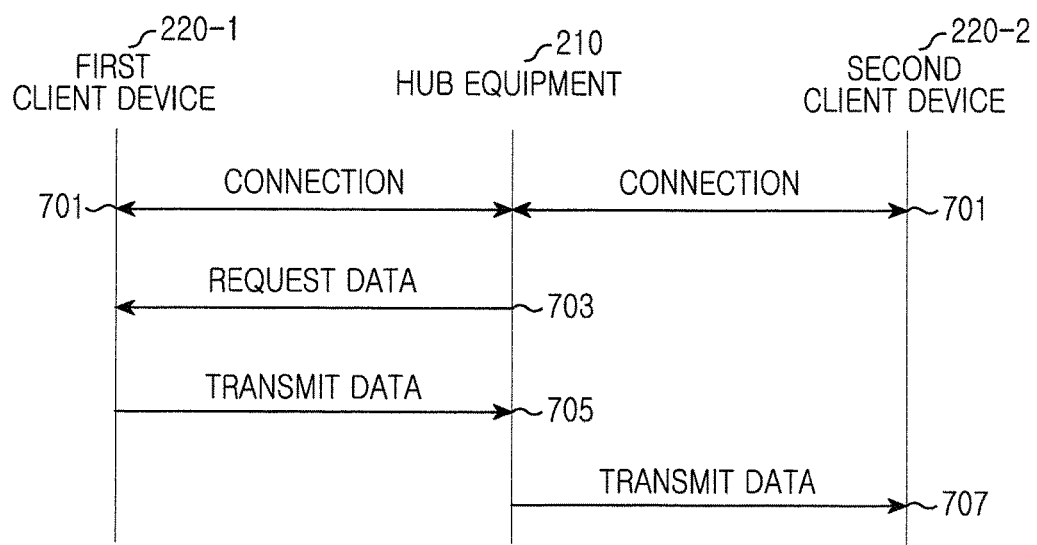
FIG. 7 illustrates a view for a communication flow between a hub equipment and client devices according to an exemplary embodiment of the present disclosure.

FIG. 7 illustrates a view for a communication flow between a hub equipment and client devices according to an exemplary embodiment of the present disclosure. In describing FIG. 7, it is assumed that a first client device is a data provider and a second client device is a data receiver.

Referring to FIG. 7, the hub equipment 210 and the client devices 220-1 and 220-2 are connected in step 701. As described above, this connection may be a condition for a trigger operation of relevant data sharing. The hub equipment 210 may transmit/receive data to/from the first client device using a first transmission protocol, and may transmit/receive data to/from the second client device using a second transmission protocol. The first transmission protocol and the second transmission protocol may be the same or different from each other.

The hub equipment 210 requests the first client device 220-1 to transmit data in step 703, and the first client device 220-1 transmits the data to the hub equipment 210 in step 705.

Next, the hub equipment 210 transmits the data received from the first client device 220-1 to the second client device 220-2 in step 707.

Consequently, a system and a method for sharing data according to an exemplary embodiment of the present disclosure may share data between devices having different kinds of protocols, and personalize data sharing between devices.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A hub device comprising:
   a storage unit configured to store a plurality of transmission protocols and instructions for data sharing; and
   a controller configured to:
      register a user permitted to define the instructions for data sharing;
      enter a setting mode for allowing the user to define the instructions for data sharing when a user authentication is successful via a log-in process;
      define, based on user inputs, the instructions in the setting mode, and storing the user-defined instructions in the storage unit; and wherein defining the instructions in the setting mode based on the user inputs comprises:
  selecting a first client device to transmit data and a second client device to receive the data among a plurality of client devices,
  designating a data path between the first client device and the second client device, wherein the data path comprises a data upload location in a storage area of the first client device where the data is stored, and a data download location in a storage area of the second client device where the data is to be stored,
  registering trigger for initiating the data sharing, and
  registering an ID and a password used to access the first client device in order to obtain the data from the first client device,
detect the trigger, and
process the instructions in response to detecting the trigger, wherein processing the instructions comprises:
  identifying the first client device to transmit data and the second client device to receive the data,
  identifying the data path between the first client device and the second client device,
  requesting the first client device to transmit the data stored in the data upload location to the hub device,
  receiving the data in the data upload location from the first client device using a first transmission protocol thereby the data is uploaded in the hub device,
  requesting the second client device to receive the data and to store the data in the designated data download location, and
  transmitting the received data to the second client device using a second transmission protocol thereby the data is downloaded in the data download location to the second client device, wherein the second transmission protocol is different from the first transmission protocol.

2. The hub device of claim 1, wherein the trigger is configured to denote that one of: a period arrives or a specific time arrives.

3. The hub device of claim 1, wherein the trigger is configured to denote a determination that the first client device updates data.

4. The hub device of claim 1, wherein one of the first client device or the second client device is communicatively linked with the controller using one of: a Digital Living Network Alliance (DLNA), Bluetooth, Near Field Communication (NFC), or a Wireless Fidelity (WiFi) connection.

5. The hub device of claim 1, wherein one of the first client device or the second client device comprises a web server.

6. The hub device of claim 1, wherein the controller is accessible to one or more different kinds of networks.

7. The hub device of claim 1, further comprising a communication unit configured to build a communication network among the plurality of client devices.

8. The hub device of claim 1, wherein the trigger is configured to denote that both the first and second client devices are discovered to communicate with the hub device.

9. A data sharing method implemented using a hub device, the method comprising:
  registering a user permitted to define instructions for data sharing;
  entering a setting mode for allowing the user to define the instructions for data sharing when user authentication is successful via a log-in process;
  defining, based on user inputs, the instructions in the setting mode, and storing the user-defined instructions in a storage unit of the hub device, wherein defining the instructions in the setting mode based on the user inputs comprises:
    selecting a first client device to transmit data and a second client device to receive the data among a plurality of client devices,
    designating a data path between the first client device and the second client device, wherein the data path comprises a data upload location in a storage area of the first client device where the data is stored, and a data download location in a storage area of the second client device where the data is to be stored,
  registering trigger for initiating the data sharing, and
  registering an ID and a password used to access the first client device in order to obtain the data from the first client device,
  detecting the trigger and processing the instructions in response to detecting the trigger, wherein processing the instructions comprises:
    identifying the first client device to transmit the data and the second client device to receive the data,
    identifying the data path between the first client device and the second client device,
    requesting the first client device to transmit the data stored in the data upload location to the hub device,
    receiving the data in the data upload location from the first client device using a first transmission protocol thereby the data is uploaded in the hub device; and
    requesting the second client device to receive the data and to store the data in the data download location, and
    transmitting the received data to the second client device using a second transmission protocol thereby the data is downloaded in the data download location of the second client device, wherein the second transmission protocol is different from the first transmission protocol.

10. The method of claim 9, wherein the trigger is configured to denote that both the first and second client devices are discovered to communicate with the hub device.

11. The method of claim 9, wherein the trigger is configured to denote that one of: a period arrives or a specific time arrives.

12. The method of claim 9, wherein the trigger is configured to denote a determination that the first client device updates the data.

13. The method of claim 9, wherein the hub device is communicatively linked with one of the first client device or the second client device using one of: a Digital Living Network Alliance (DLNA), Bluetooth, Near Field Communication (NFC), or a Wireless Fidelity (WiFi) connection.

14. The method of claim 9, wherein one of the first client device or the second client device comprises a web server.

15. The method of claim 9, wherein the hub device is accessible to one or more different kinds of networks.

* * * * *